US006979484B2

(12) United States Patent
Lewis

(10) Patent No.: US 6,979,484 B2
(45) Date of Patent: Dec. 27, 2005

(54) FAN-FOLDED INSULATION LAMINATE WITH REINFORCED HINGES

(76) Inventor: David L. Lewis, 188 Carmel Hill Rd. South, Bethlehem, CT (US) 06751

( * ) Notice: Subject to any disclaimer, the term of this patent is extended or adjusted under 35 U.S.C. 154(b) by 174 days.

(21) Appl. No.: 10/754,263

(22) Filed: Jan. 9, 2004

(65) Prior Publication Data

US 2005/0153092 A1 Jul. 14, 2005

(51) Int. Cl.[7] .................................................. B32B 3/10
(52) U.S. Cl. ......................... 428/56; 428/126; 428/192; 428/136; 156/268
(58) Field of Search ............................ 428/55, 56, 126, 428/136, 192; 156/268; 52/268, 309.9, 404.1, 52/404.4, 406.1, 406.2

(56) References Cited

U.S. PATENT DOCUMENTS

| | | | |
|---|---|---|---|
| 2,142,547 | A | 1/1939 | Anderson |
| 4,001,996 | A | 1/1977 | Byrd |
| 4,033,806 | A | 7/1977 | Lindenschmidt |
| 4,342,610 | A | 8/1982 | Ray |
| 4,397,898 | A | 8/1983 | Ray |
| 5,310,594 | A | 5/1994 | Holland et al. |
| 5,950,568 | A | 9/1999 | Axelrod et al. |
| 6,165,305 | A | 12/2000 | Weinstein et al. |
| 6,185,895 | B1 | 2/2001 | Rettew |
| 6,230,750 | B1 | 5/2001 | Lessard et al. |
| 6,383,594 | B2 | 5/2002 | Weinstein et al. |
| 6,457,237 | B1 | 10/2002 | Matthews et al. |
| 6,468,615 | B2 | 10/2002 | Weinstein et al. |
| 6,484,463 | B1 | 11/2002 | Fay |
| 6,551,677 | B2 | 4/2003 | Weinstein et al. |
| 2002/0015814 | A1 | 2/2002 | Weinstein et al. |

*Primary Examiner*—Alexander S. Thomas

(57) ABSTRACT

A fan-folded insulating board laminate comprises an extended length of synthetic resin foam board having longitudinal edges and protective skins adhered to each surface of the foam board. Reinforcing strips are spaced along both of the longitudinal edges of the laminate and are bonded to both of the skins. They extend about the longitudinal edges, and the laminate has a series of longitudinally spaced cuts through the board and alternately through one of the protective skins. The uncut skin and strip act as a hinge between adjacent sections of the board to enable fan-folding of the laminate.

19 Claims, 2 Drawing Sheets

FAN-FOLDED INSULATION LAMINATE WITH REINFORCED HINGES

BACKGROUND OF THE INVENTION

The present invention relates to fan-folded insulating board, and, more particularly, to fan-folded insulating board having reinforced hinges between adjacent panels.

Insulating board is widely employed in building construction to provide thermal and sound insulation, and also to level the surface for the installation thereover of exterior siding such as vinyl and aluminum. The insulating board provides a flat reference plane in which the siding is applied.

Generally, the building panels are laminates of a synthetic resin foam board such as polystyrene or polyurethane with protective skins on each surface thereof. The skins provide rigidity for the laminate and also act as hinges when the laminate is scored alternately on opposite sides to permit fan-folding of the panels.

Providing the insulating board laminate as fan-folded panels is highly desirable from the standpoint of transportation and ease of mounting on vertical surfaces. In making the fan-folds, the laminate is scored on alternate surfaces to a depth short of the protective film on the other surface, and the remaining depth of the foam board will break between the adjacent panels upon folding force being applied thereto.

Subsequently, the installer secures the first panel to the wall with fasteners and the remaining panels can cascade and be secured to the underlying structure. During the unsupported cascading and prior to the fastening of the remaining panels, there are significant stresses at the hinges where the product is scored. There is a tendency for the skin serving as the hinge to peel away from the board and to delaminate beginning at the hinge area at the top and the bottom of the panels. This delamination reduces the rigidity of the product and makes the installation more difficult and time consuming. As a result, greater care in handling and support of the cascading panels is required in order to minimize the stresses on the hinges and to minimize delamination of the skins. In an effort to deal with this problem, the strength of the bond between the skin and the foam board can be increased, generally at greater cost and not always successfully.

Accordingly, it is an object of the present invention to provide a novel fan-folded insulating foam board in which the hinge joints are reinforced to minimize the tendency for delamination.

It is also an object to provide such a fan-folded insulating board which can be produced relatively easily and economically.

Another object is to provide a method for producing such fan-folded insulating foam board.

SUMMARY OF THE INVENTION

It has now been found that the foregoing and related objects may be readily attained in a fan-folded insulating board laminate comprising an extended length of synthetic resin foam board having longitudinal edges and protective skins are adhered to each surface of the foam board. Reinforcing strips spaced along both of the longitudinal edges of the laminate, and they are bonded to both of the skins and extend about the longitudinal edges. The laminate has a series of longitudinally spaced cuts through the board and alternate through one of the protective skins. The uncut skin and strip acting as a hinge between adjacent sections of the board to enable fan-folding of the laminate.

Preferably the reinforcing strips are fabricated of synthetic resin film which is fiber or structurally reinforced by contouring the film with reinforcing ribs. The overall length of the reinforcing strips adhered to each of the skins is 0.4–3.0 inches, and the width of the reinforcing strips is 0.5–2.0 inches.

The skins are fabricated of synthetic resin film, and one or both of the skins may be metallized. The skins may also be a laminate of paper and metal foil or a laminate of synthetic resin film and paper or combinations thereof.

The fan-folded insulating board laminate by first laminating protective skins on each face of a synthetic resin foam board of extended length. Reinforcing strips are adhered to the skins at spaced points along the longitudinal edges of the foam board, and they extend about the longitudinal edge of the foam board and onto both skins. Alternating skins are transversely scored. The score lines extend through the reinforcing strips thereon and the foam board to produce a series of fold lines defining a series of panels along the length of the laminate with the unscored skin and strip of the laminate providing a hinge connection between adjacent panels whereby the laminate may be fan-folded.

BRIEF DESCRIPTION OF THE ATTACHED DRAWINGS

DETAILED DESCRIPTION OF THE ILLUSTRATED EMBODIMENT

Figure 1:
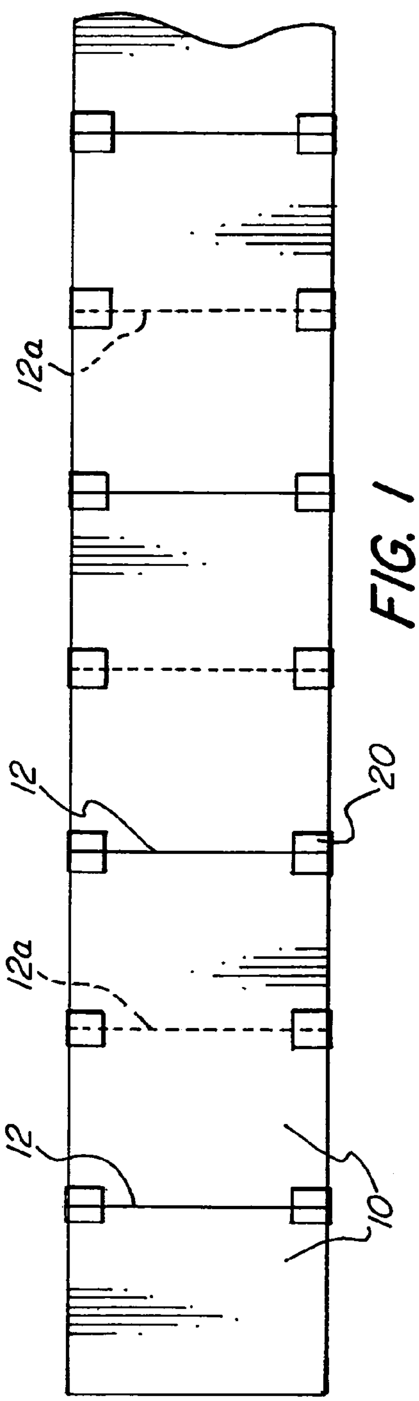
FIG. 1 is a fragmentary plan view of an unfolded laminate and folded insulating foam board laminate embodying the present invention.

Turning first to FIG. 1, therein illustrated is an elongated insulating laminate comprised of a series of panels 10 formed by the score lines 12 which are substantially uniformly spaced along the length of the laminate.

Figure 3:
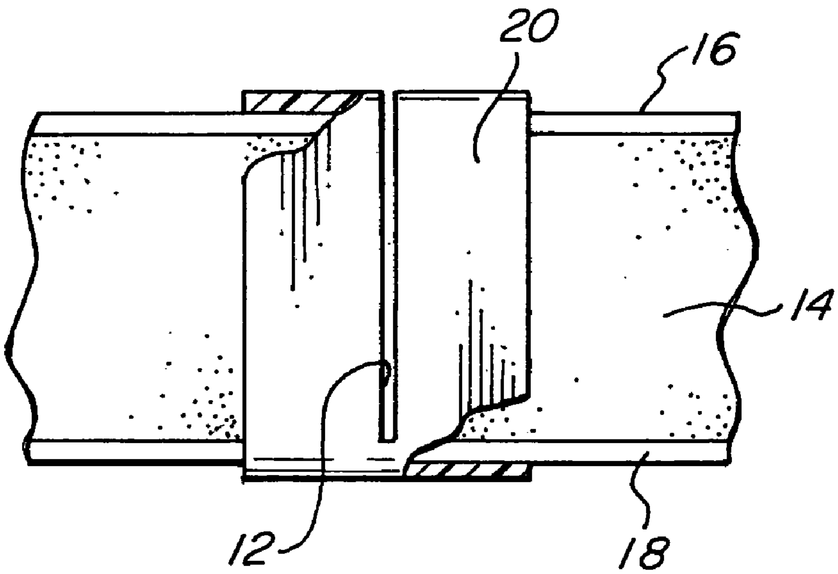
FIG. 3 is an enlarged fragmentary side elevational view thereof in partial section.
Figure 4:
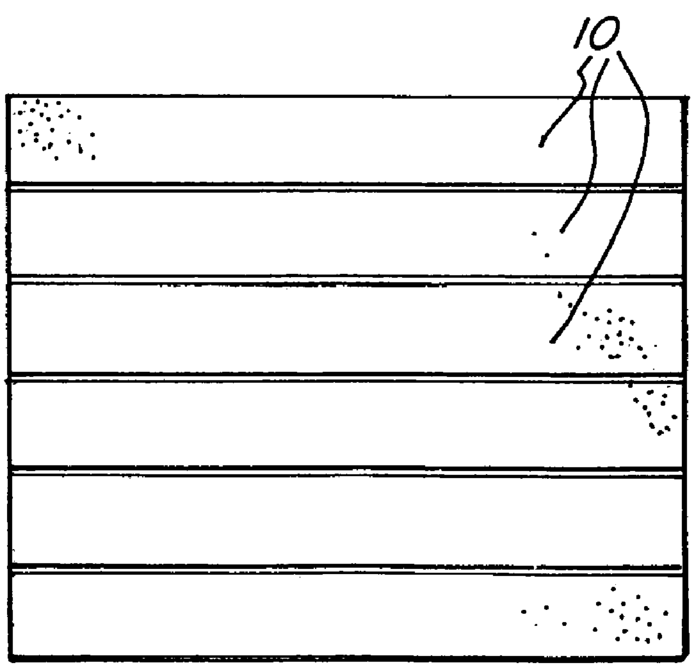
FIG. 4 is a side elevational view of a folded foam insulating board laminate embodying the present invention.

As seen in FIG. 3, the laminate has a synthetic resin foam board 14 as its core and protective skins 16, 18 adhered to its opposite surfaces. On the longitudinal edges at each of the score lines 12, there are reinforcing strips 20 which are bonded to the skins 16, 18 and which extend about the longitudinal edges of the laminate.

The score lines 12 cut through one of the skins 16, 18 and the reinforcing strip 20 thereon and through most of the thickness of the foam board 14. The opposite skin 16, 18 is uncut and the remaining thickness of the foam board will fracture when folding force is applied.

Figure 2:
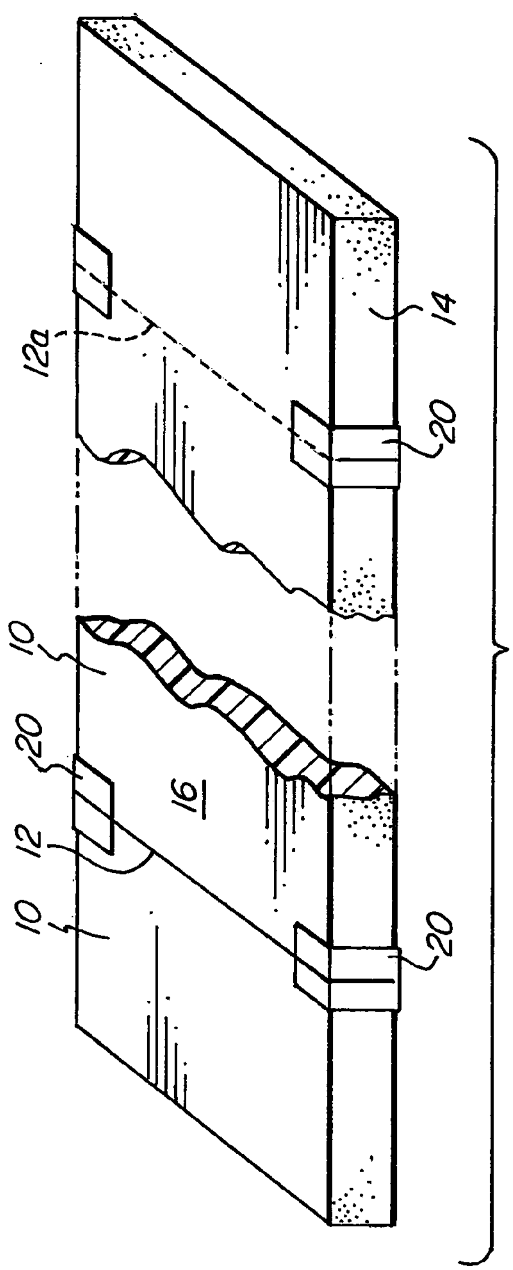
FIG. 2 is a fragmentary enlarged perspective view thereof.

As illustrated by the solid score lines 12 and broken score lines 12*a* in FIGS. 1 and 2, the score lines alternate as to the skin 16, 18 which they penetrate. As seen in FIG. 3, the uncut skin 18 and the uncut reinforcing strip 20 function as a hinge between the adjacent panels 10.

The reinforcing strip 20 strongly adheres to the skins 16 and 18, and locks the skins 16, 18 to the foam board 14 so as to substantially preclude peeling or delaminating of the skins 16, 18 from the board 14. The delaminating forces are resisted by the tensile strength of the reinforcing strip 20.

Thus, relatively thin material may be used for the skins 16, 18, and high bond strength between the skins 16, 18 and the board 14 is not necessary.

In the production of the laminate, a relatively long length of the foam board is passed through a laminating station at which the top and bottom skins are placed on the faces of the board and bonded thereto generally by heat and pressure, although an intermediate coating of adhesive may also be employed. As the now laminated board exits the laminating station, reinforcing elements are applied to each edge of the laminate at spaced positions so that it adheres to both skins. These reinforcing strips are applied at a fixed spacing so that the scoring mechanism for the fan-fold will essentially cut through the middle of the reinforcing strip.

The reinforcing strips are normally fed from a roll and picked up by vacuum in an application mechanism which is synchronized with the blades on the subsequent scoring mechanism. After the reinforcing strip has been applied and adhered to the skins, the scoring blades register with the center of the reinforcing elements and cut through the reinforcing elements, the underlying skin and through most of the foam board leaving only a small thickness of the foam board and the uncut skin on the opposite face.

The foam boards are generally fabricated of polystyrene or polyurethane resins which are foamed to produce a lightweight and efficient insulating structure. The thickness of the board may vary from as little as one quarter inch to one inch and even greater if so desired. Typically, the board will have a width of four feet and a length of 12–50 feet depending upon the size of the fan-folded laminate which is ultimately desired.

The protective skins are synthetic resin film and polyethylene, polypropylene and polyester resins may be readily utilized in the laminating process. A combination of heat and pressure with thermoplastic film can be utilized to effect the bonding at the laminating station. However, the film or the board may be coated with an adhesive to effect the bonding to the foam board. Alternatively, the protective skins may also be provided of laminates of film and paper, or foil and paper, or combinations thereof. Moreover, the plastic film can be metallized to provide reflecting properties. Different materials may be used for the skins on the two surfaces.

The reinforcing strips are generally cut from a roll of synthetic resin film which is preferably fiber reinforced with the fibers extending in the longitudinal direction. Alternatively, a scrim can be embedded in the synthetic resin of the reinforcing strip. The reinforcing strip will generally be coated with adhesive to effect the firm bond with the skins and the bonding pressure is provided by passing the laminate through a roll nip. Typically, the reinforcing strips will have a length of 0.6–4.0 inches depending upon the thickness of the board and a width of 0.5–2.0 inches.

In lieu of a separate adhesive coating, heat and pressure may be applied to thermoplastic components to effect the desired adhesion or bonding of strip to protective skins.

The width of the panels can be varied to suit the desires of the trade. Typically, a panel 4 feet wide by 24 feet long and ⅜ inch thickness can be scored every 2 feet and fan-folded into a bundle which is 2 feet by 4 feet and 9 inches high so that it is easily transported and easily mounted on the support surface.

Thus, it can be seen from the foregoing detailed description and attached drawings that the insulating foam board laminate of the present invention is one which provides relatively strong hinge support between the adjacent panels and is simple and economical to fabricate.

Having thus described the invention, what is claimed is:

1. A fan-folded insulating board laminate comprising:

(a) an extended length of synthetic resin foam board having longitudinal edges;

(b) protective skins adhered to each surface of said foam board; and (c) reinforcing strips spaced along both of said longitudinal edges of said laminate, said strips being bonded to both of said skins and extending about said longitudinal edges; said laminate having a series of longitudinally spaced cuts through said board and alternately through one of said protective skins, the uncut skin and strip acting as a hinge between adjacent sections of said board to enable fan-folding of said laminate.

2. The fan-folded insulating board laminate in accordance with claim 1 wherein said reinforcing strips are fabricated of synthetic resin film.

3. The fan-folded insulating board laminate in accordance with claim 2 wherein said reinforcing synthetic resin film of said strips is fiber reinforced or structurally contoured, to resist tearing.

4. The fan-folded insulating board laminate in accordance with claim 1 wherein the length of said reinforcing strips on each of said skins is 0.4–4.0 inches.

5. The fan-folded insulating board laminate in accordance with claim 4 wherein the width of the reinforcing strips is one quarter inch to 4 inches.

6. The fan-folded insulating board laminate in accordance with claim 1 wherein said protective skins are fabricated of synthetic resin film.

7. The fan-folded insulating board laminate in accordance with claim 6 wherein one or both of said protective skins is metallized.

8. The fan-folded insulating board laminate in accordance with claim 1 wherein at least one of said protective skins is a laminate of paper and metal foil.

9. The fan-folded insulating board laminate in accordance with claim 1 wherein at least one of said protective skins is a laminate of synthetic resin film and paper.

10. In a method for forming fan-folded insulating board laminate, the steps comprising:

(a) adhering protective skins on each face of a synthetic resin foam board of extended length;

(b) adhering to the protective skins at spaced points along the longitudinal edges of said foam board reinforcing strips which extend about the longitudinal edge of said foam board and onto both skins; and (c) transversely scoring alternating skins and the reinforcing strips thereon and said foam board to produce a series of fold lines defining a series of panels along the length of said laminate with the unscored skin and strip of said laminate providing a hinge connection between adjacent panels whereby said laminate may be fan-folded.

11. The method for making a fan-folded insulating board laminate in accordance with claim 10 wherein said reinforcing strips are fabricated of synthetic resin film.

12. The method for making a fan-folded insulating board laminate in accordance with claim 11 wherein said synthetic resin film of said reinforcing strips is fiber reinforced or structurally contoured to resist tearing.

13. The fan-folded insulating board laminate in accordance with claim 10 wherein the length of said reinforcing strips on each of said skins is 0.4–4.0 inches.

14. The fan-folded insulating board laminate in accordance with claim 13 wherein the width of the uncut strips is 0.5–2.0 inches.

15. The fan-folded insulating board laminate in accordance with claim 10 wherein said skins are fabricated of synthetic resin film.

16. The fan-folded insulating board laminate in accordance with claim 15 wherein at least one of said skins is metallized.

17. The fan-folded insulating board laminate in accordance with claim 10 wherein said skin is a laminate of paper and metal foil.

18. The fan-folded insulating board laminate in accordance with claim 10 wherein at least one of said skins is a laminate of synthetic resin film and paper.

19. The fan-folded insulating board laminate in accordance with claim 10 wherein the depth of said scoring leaves a small thickness of said board which breaks upon application of folding force.

* * * * *